US011209037B2

(12) United States Patent
Adams (10) Patent No.: US 11,209,037 B2
(45) Date of Patent: Dec. 28, 2021

(54) SCREW AND ANCHOR ASSEMBLY

(71) Applicant: David Adams, Longview, WA (US)

(72) Inventor: David Adams, Longview, WA (US)

( * ) Notice: Subject to any disclaimer, the term of this patent is extended or adjusted under 35 U.S.C. 154(b) by 370 days.

(21) Appl. No.: 16/503,223

(22) Filed: Jul. 3, 2019

(65) Prior Publication Data

US 2021/0003161 A1 Jan. 7, 2021

(51) Int. Cl.
*F16B 25/00* (2006.01)
*F16B 25/10* (2006.01)

(52) U.S. Cl.
CPC ........ *F16B 25/0026* (2013.01); *F16B 25/103* (2013.01); *F16B 25/00* (2013.01)

(58) Field of Classification Search
CPC .... F16B 25/00; F16B 25/0026; F16B 25/103; F16B 33/008; F16B 35/00; F16B 37/12
USPC .............. 411/16, 383, 386, 387.1, 411, 417
See application file for complete search history.

(56) References Cited

U.S. PATENT DOCUMENTS

| | | | | |
|---|---|---|---|---|
| 3,911,781 A * | 10/1975 | Bappert | ............... | F16B 13/002 411/418 |
| 4,900,210 A * | 2/1990 | Buchanan | ............. | F16B 19/004 411/392 |
| 6,196,780 B1 * | 3/2001 | Wakai | .................. | F16B 13/002 411/21 |
| 7,934,895 B2 * | 5/2011 | Ernst | .................... | F16B 37/127 411/44 |
| 8,057,147 B2 * | 11/2011 | Ernst | .................... | F16B 35/048 411/387.1 |
| 2005/0175432 A1 * | 8/2005 | Su | ........................... | F16B 25/10 411/417 |
| 2013/0209192 A1 * | 8/2013 | Wood | .................... | E21D 21/008 411/82 |
| 2015/0023760 A1 * | 1/2015 | Bove, III | ............. | F16B 13/002 411/383 |
| 2016/0003283 A1 * | 1/2016 | Call | .................... | F16B 25/0021 411/387.1 |
| 2016/0215810 A1 * | 7/2016 | Echito | ................... | F16B 25/103 |
| 2018/0156255 A1 * | 6/2018 | Kowalenko | ........... | F16B 37/127 |
| 2020/0063783 A1 * | 2/2020 | Aufenanger | ......... | F16B 37/127 |
| 2021/0040971 A1 * | 2/2021 | Pirozzi | ................. | F16B 13/124 |

\* cited by examiner

*Primary Examiner* — Roberta S Delisle (57) ABSTRACT

A screw and anchor assembly include a male fastener and a female anchor. The male fastener only has threads or half-circular fins on half of the surface area. The other half is just like a regular cylinder. The female anchor only has threads or half-circular fins on half of the inner surface area. The other half is just like the inner wall of a regular cylinder. The user may push the male fastener into the female anchor, so the half-circular fins on the male fastener engages with the half-circular fins inside the female anchor and locks the male fastener to the female anchor. When the user needs to remove the male fastener, simply turns the male fastener 180 degrees and disengages the half-circular fins on the male fastener from the half-circular fins on the female anchor, then pull the male fastener from the female anchor.

13 Claims, 11 Drawing Sheets

SCREW AND ANCHOR ASSEMBLY

FIELD OF THE INVENTION

The present invention relates generally to a screw and anchor assembly. More specifically, both male fastener and female anchor only have threads or half-circular fins on one side, which allows the user to introduce the male fastener into the female anchor without any other tools, and also allow makes the removal of male fastener from the female anchor easier.

BACKGROUND OF THE INVENTION

Many constructions or internal decorations use drywall to accommodate various situations. There are also many fastener and anchor assembly invented so the user can attach various objects on the drywall or other surfaces on a temporary to permanent basis. In the current practice, the user may place an anchor into the drywall or other surfaces, then the user needs the assistance of a screwdriver or other tool to introduce a screw into the anchor. The screw may expand the anchor to further secure the entire anchor screw onto the drywall. When the user needs to remove the anchor screw, the user needs to first remove the screw with a screwdriver or other tool. The anchor may shrink and loosen up from the drywall as the screw is removed, and the user may remove the anchor from the drywall or other surfaces. However, issue arises when the user is trying to use anchor screw on drywall or other surfaces/devices, since the steps of installing and uninstalling the anchor screw require both strength and other tools.

The present invention solves the above issue by providing a newly designed screw and anchor assembly. Different from other anchor screw on the market, both fastener and anchor in the present invention only have threads or plurality of half-circular fins on half of the surface area. More specifically, the male fastener in the present invention only has a plurality of half-circular fins on half of the surface area, the other half just looks like a regular cylinder. The female anchor also only has a plurality of half-circular fins on half of the inner surface. Instead of using a screwdriver to install the male fastener into the female anchor, the user simply needs to line up the plurality of half-circular fins located on both the male fastener and the female anchor and push the male fastener into the female anchor with bare hand. The plurality of half-circular fins on the male fastener then locks itself with the plurality of half-circular fins on the female anchor. When the user needs to remove the male fastener, the user just needs to turn the male fastener 180 degrees so the plurality of half-circular fins on the male fastener then unlocks itself with the plurality of half-circular fins on the female anchor. Then the user can simply pull the male fastener away from the female anchor.

DETAIL DESCRIPTIONS OF THE INVENTION

All illustrations of the drawings are for the purpose of describing selected versions of the present invention and are not intended to limit the scope of the present invention.

The present invention is a combination of a screw and an anchor. Different from other screw and anchor combinations, the screw and the anchor in the present invention is only threaded on one side. This unique arrangement of threads enables the user to introduce the screw into the anchor without the assistance of other tools, such as screwdriver or wrench. When the user needs to remove the screw, the user can simply turn the screw 180 degrees to disengage the threads between the screw and the anchor, then pull the screw away from the anchor.

Figure 1:
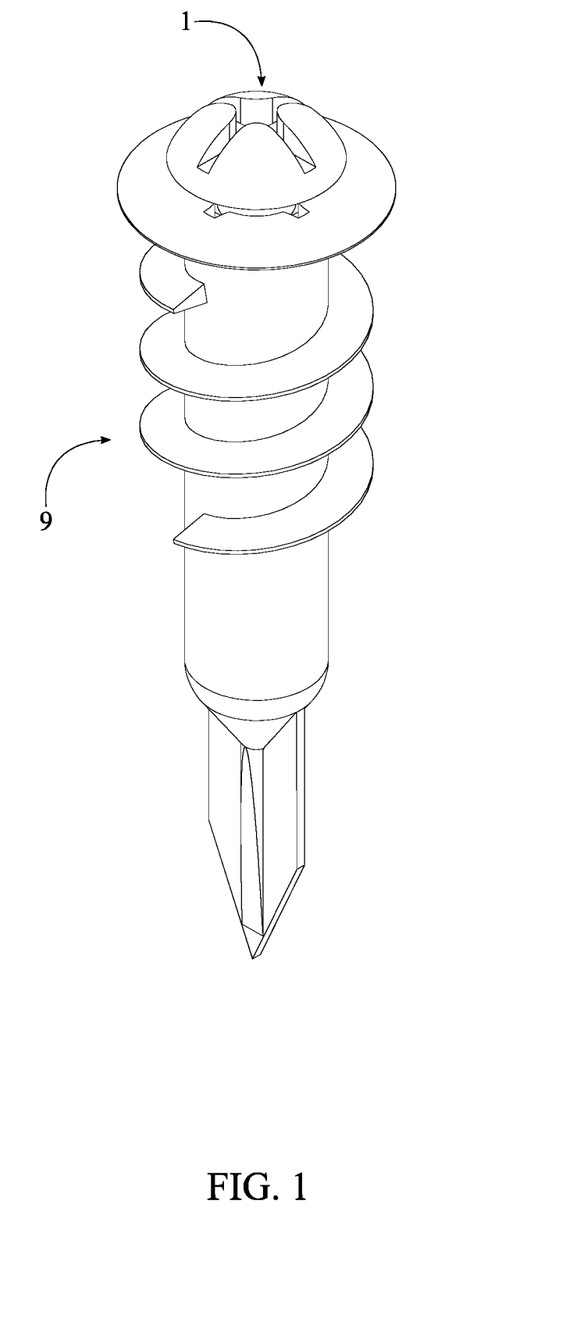
FIG. 1 is a perspective view of the present invention.
Figure 2:
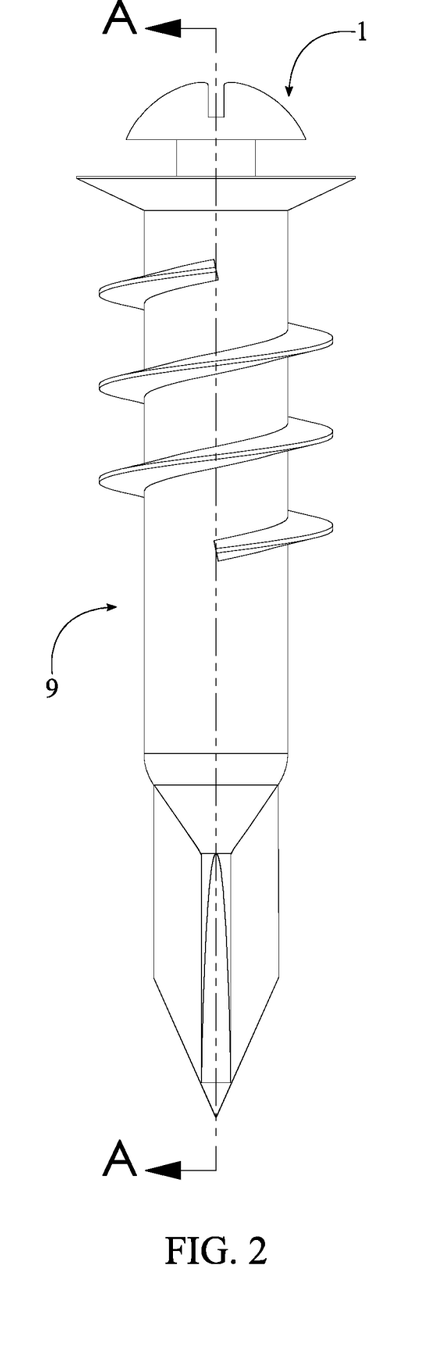
FIG. 2 is a side view of the present invention, showing the plane upon which a cross sectional view is taken shown in FIG. 3.
Figure 3:
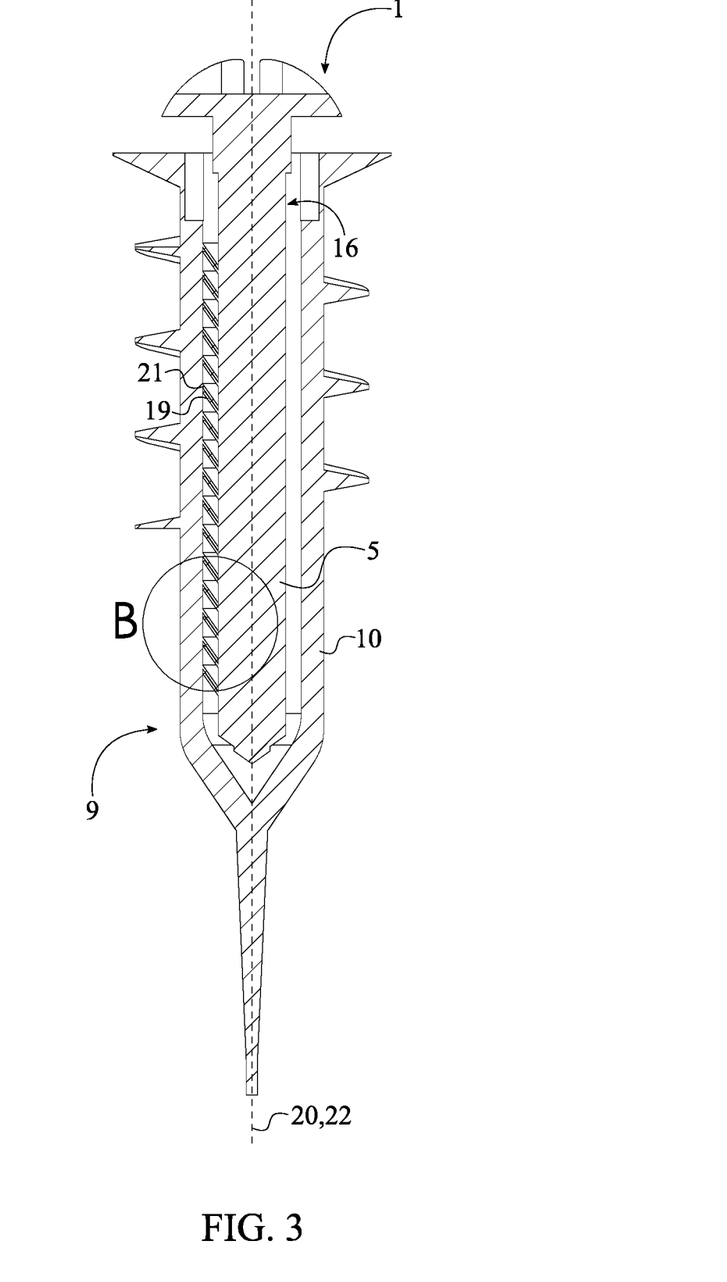
FIG. 3 is a cross section view of the present invention taken along the line A-A of FIG. 2.

In reference to FIG. 1-3, the present invention comprises a male fastener 1, a female anchor 9, a first plurality of half-circular fins 19, and a second plurality of half-circular fins 21. The male fastener 1 is in the form of nail or screw and is configured to keep the female anchor 9 in place on the drywall or other surfaces. The male fastener 1 comprises a distal shaft section 5, which is positioned between the drive 2 and the tip 15 of the male fastener 1. The distal shaft section 5 is configured to hold the first plurality of half-circular fins 19. The first plurality of half-circular fins 19 is linearly distributed along the distal shaft section 5. The rust plurality of half-circular fins 19 is configured to engage with the second plurality of half-circular fins 21 to prevent the male fastener 1 from slipping away from the female anchor 9.

Figure 4:
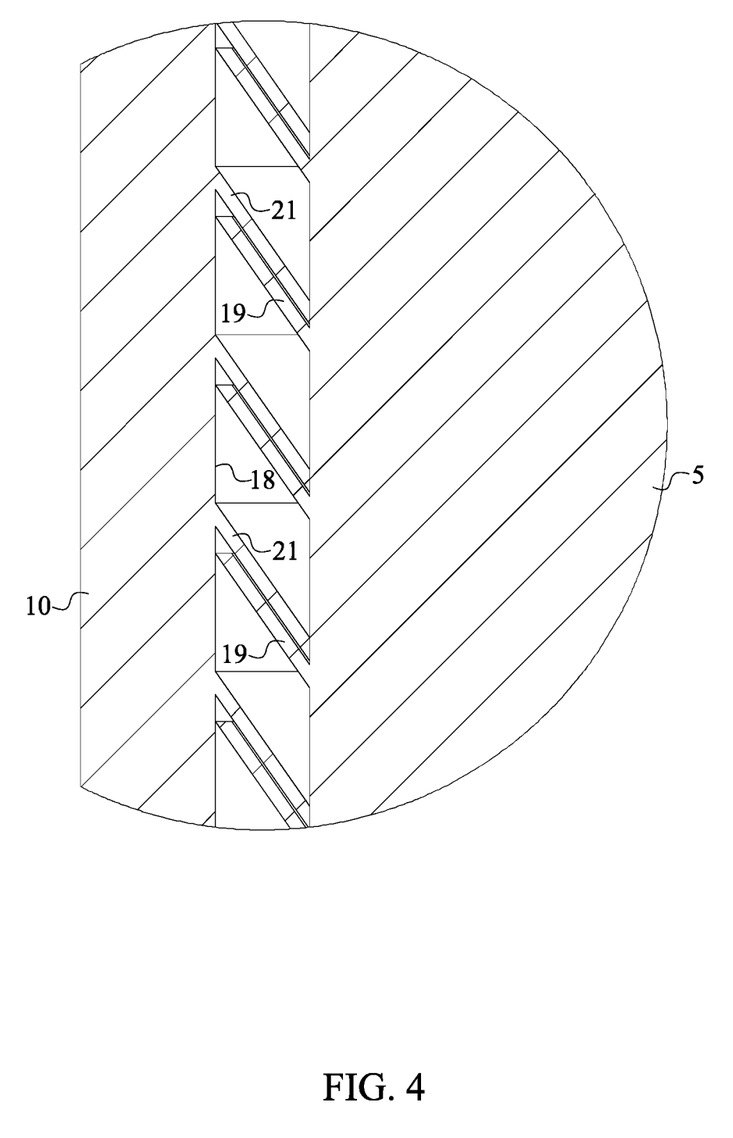
FIG. 4 is a detail view of the first plurality of half-circular fins and the second plurality of half-circular fins along the circle B of FIG. 3.

In reference to FIGS. 3 and 4, the female anchor 9 is in the form of anchor screws and is configured to threadedly drives into the drywall before the user introduces the male fastener 1 into the female anchor 9. The female anchor 9 comprises a main opening 16 and an inner wall 18. The user may introduce the male fastener 1 into the female anchor 9 via the main opening 16. The inner wall 18 is configured to hold the second plurality of half-circular fins 21, as the second plurality of half-circular fins 21 is linearly distributed along the inner wall 18. When the user introduces the male fastener 1 into the female anchor 9 via the main opening 16, the first plurality of half-circular fins 19 on the distal shaft section 5 engages with the second plurality of half-circular fins 21 on the inner wall 18 to prevent the male fastener 1 from slipping away from the female anchor 9 via the main opening 16. The distal shaft section 5 is concentrically traversing into the main opening 16 as the user introduces the male fastener 1 into the female anchor 9. This configuration ensures the first plurality of half-circular fins 19 is properly engaged with the second plurality of half-circular fins 21.

In reference to FIGS. 3, 4, 10, and 11, the first plurality of half-circular fins 19 and the second plurality of half-circular fins 21 are linearly aligned with each other when the male fastener 1 is fully introduced into the female anchor 9. This configuration ensures the male fastener 1 is fully introduced into the female anchor 9, without leaving unnecessary space between the tip 15 of the male fastener 1 and the deepest region of the female anchor 9. After the male fastener 1 is fully introduced into the female anchor 9, each of the first plurality of half-circular fins 19 is selectively engaged with each of the second plurality of half-circular fins 21. As the user may engage the first plurality of half-circular fins 19 to the second plurality of half-circular fins 21 to lock the male fastener 1 to the female anchor 9 or the user may disengage the first plurality of half-circular fins 19 to the second plurality of half-circular fins 21 to unlock the male fastener 1 from the female anchor 9 and remove the male fastener 1 from the female anchor 9.

Figure 5:
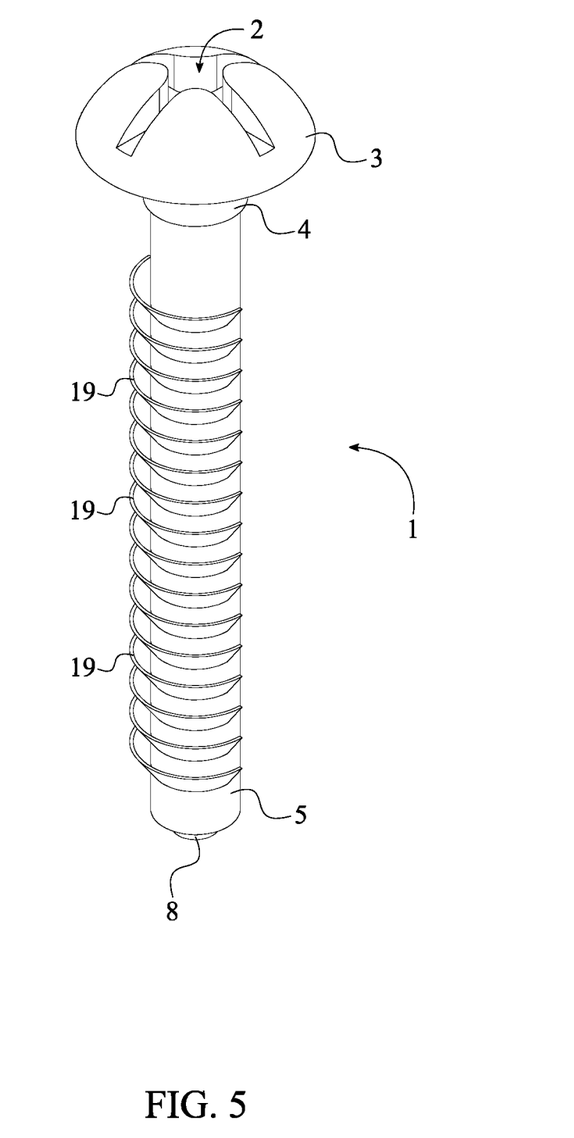
FIG. 5 is a perspective view of the male fastener.
Figure 6:
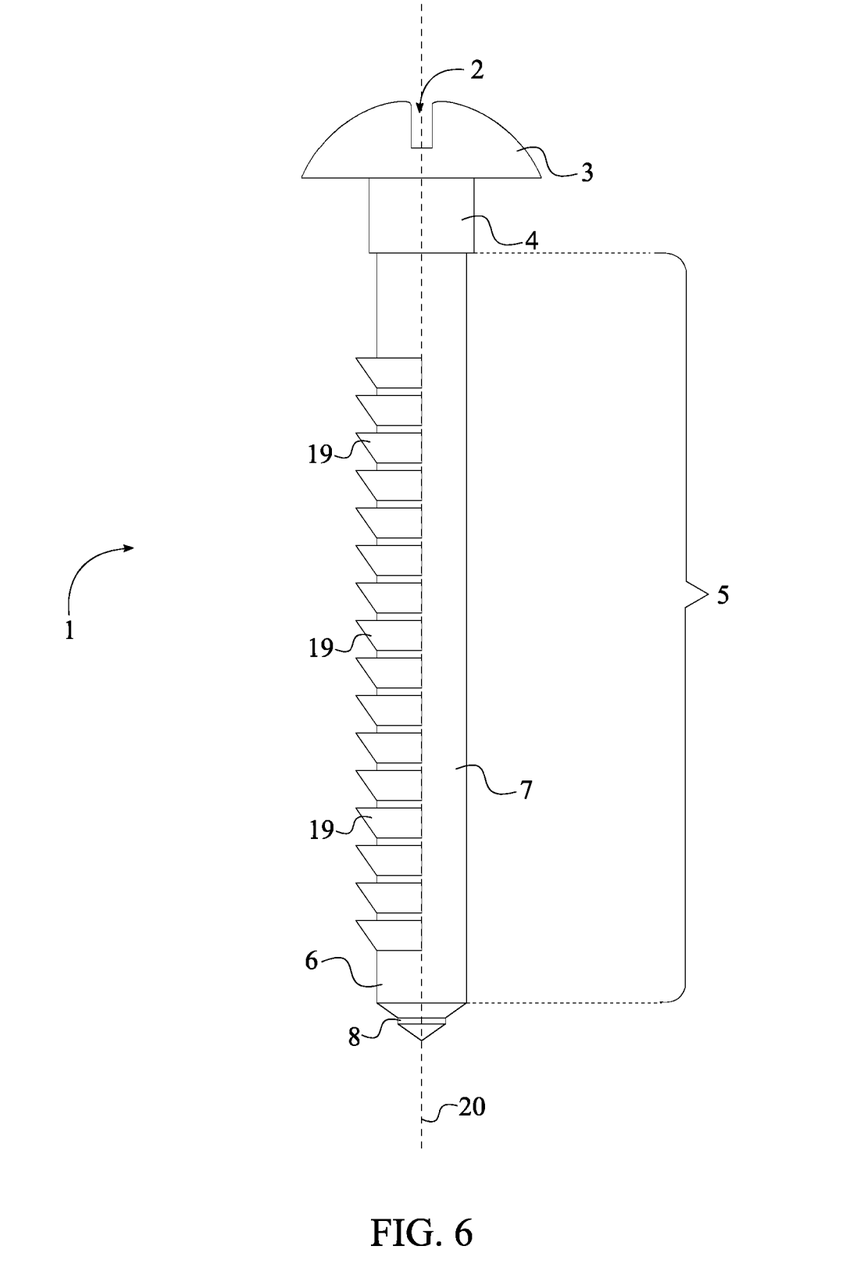
FIG. 6 is a side view of the male fastener.
Figure 10:
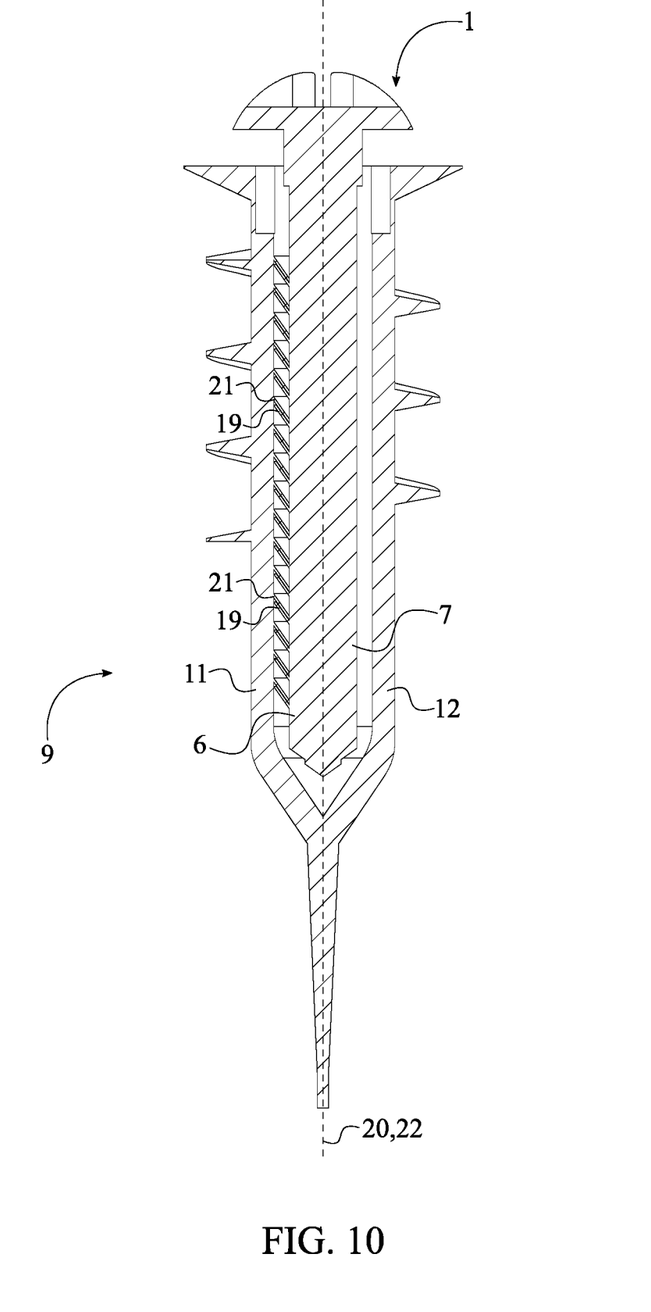
FIG. 10 is a cross section view of the male fastener and the female anchor, wherein the first plurality of half-circular fins is engaged with the second plurality of half-circular fins.

In reference to FIGS. 5, 6, and 10, the male fastener 1 further comprises a head section 3, a shank section 4, and a distal shaft section 5. The head section 3 is adjacently connected to the shank section 4 and is configured as a base that allows the user to push or pull on the male fastener 1. The shank section 4 is positioned between the head section 3 and the distal shaft section 5. The shank section 4 is configured to allow the user to grasp or hold the male fastener 1 during pulling or simply holding the male fastener 1. The distal shaft section 5 is adjacently connected to the shank section 4, opposite to the head section 3. The distal shaft section 5 is configured to hold the first plurality of half-circular fins 19 on the male fastener 1. Finally, the head section 3, the shank section 4, and the distal shaft section 5 are concentrically positioned to each other. This concentric configuration ensures that the male fastener 1 can be fully introduced into the female anchor 9 without leaving any unnecessary space from the female anchor 9.

In reference to FIGS. 5 and 10, The male fastener 1 further comprises a tip section 8. The tip section 8 is concentrically positioned with the distal shaft section 5. The tip section 8 is adjacently connected to the distal shaft section 5, opposite to the shank section 4. The tip section 8 is at the opposite end of the head section 3. The tip section 8 is configured to fill up the last remaining space within the female anchor 9, as the male fastener 1 is fully introduced into the female anchor 9. The male fastener 1 further comprises a drive 2. The drive 2 is concentrically traversing into the head section 3, opposite to the shank section 4. The drive 2 is configured to allow the user to use a flathead screwdriver, a Philip screwdriver, or other tools to introduce the male fastener 1 into the female anchor 9.

Figure 7:
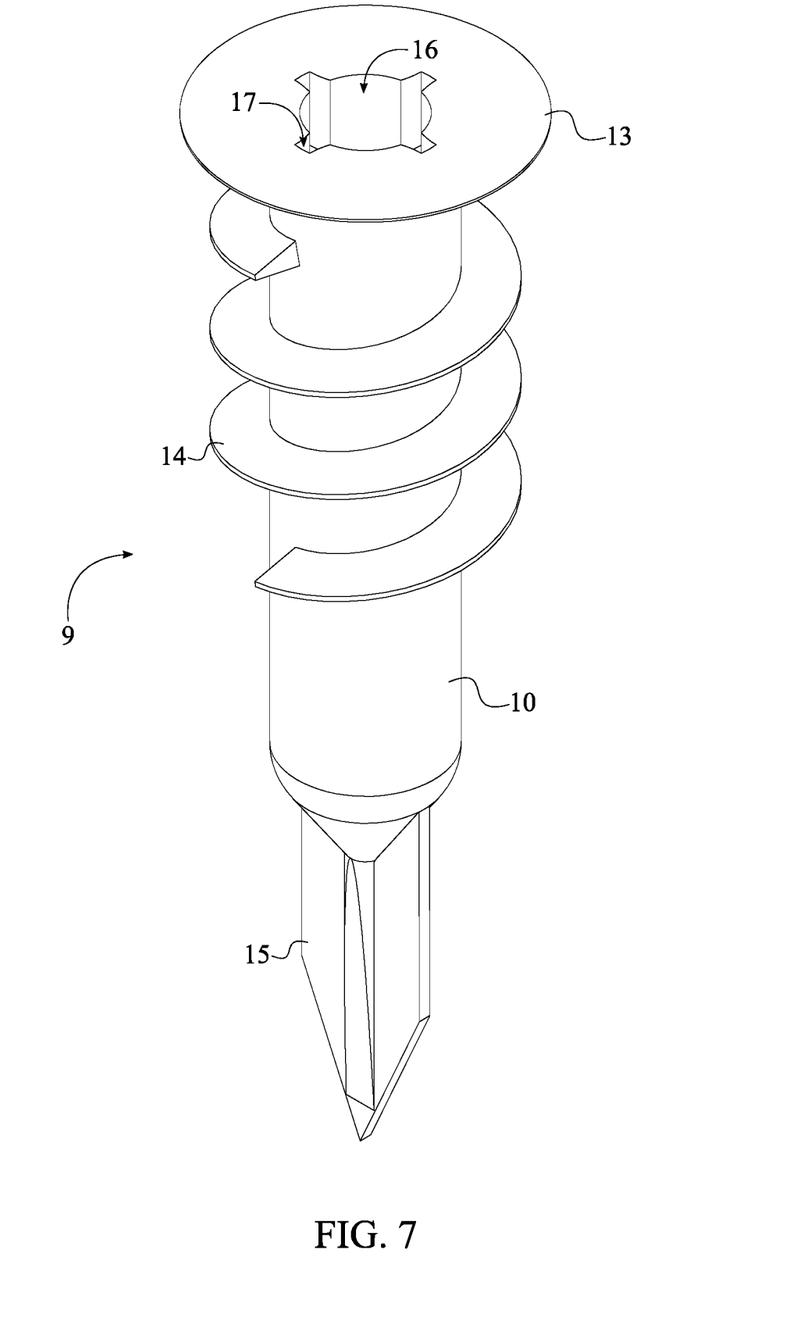
FIG. 7 is a perspective view of the female anchor.
Figure 8:
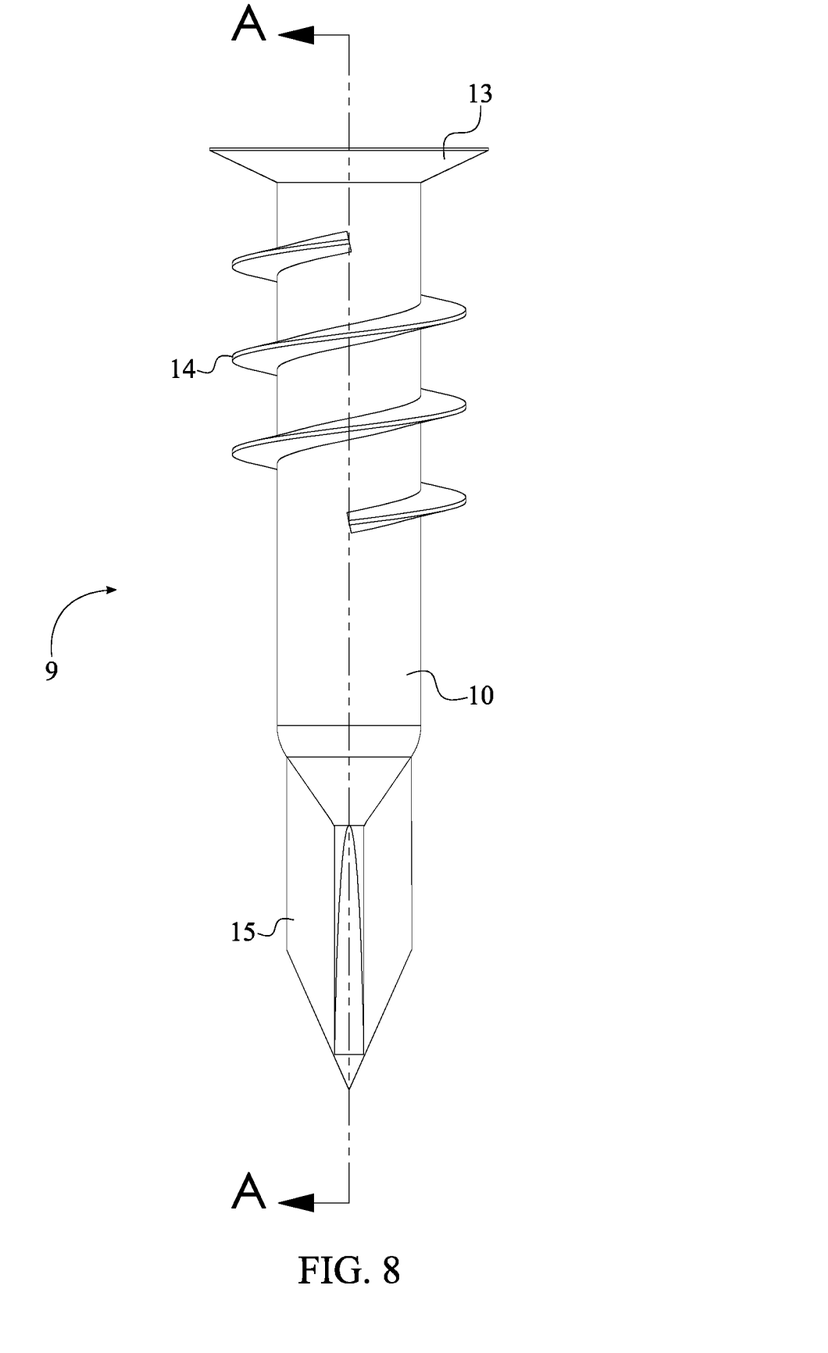
FIG. 8 is a side view of the female anchor, showing the plane upon which a cross sectional view is taken shown in FIG. 9.

In reference to FIGS. 6 and 7, the female anchor 9 comprises a cylindrical body 10, a flange 13, and at least one outer securing protrusion 14. The cylindrical body 10 and the flange 13 are concentrically positioned to each other, and the flange 13 is adjacently connected to the cylindrical body 10. The cylindrical body 10 is configured to hold the distal shaft section 5 of the male fastener 1. The flange 13 is configured to allow the user to pull out the female anchor 9 from drywall or other surfaces. The at least one outer securing protrusion 14 is positioned on the cylindrical body 10. The outer securing protrusion 14 is configured to secure the female anchor 9 on the drywall or other surfaces. The female anchor 9 further comprises a tip 15. The tip 15 is adjacently connected to the cylindrical body 10, opposite to the flange 13. The tip 15 is configured to drill an opening on the drywall or other surfaces so the rest of the female anchor 9 can be easily secured on the drywall.

In reference to FIG. 7, the female anchor 9 further comprises a drive 17. The drive 17 is concentrically traversing into the flange 13 and the cylindrical body 10. The drive 17 is configured to allow the user to use a flat head screwdriver, a Philip screwdriver, or other tools to introduce the female anchor 9 into drywall or other surfaces.

Figure 9:
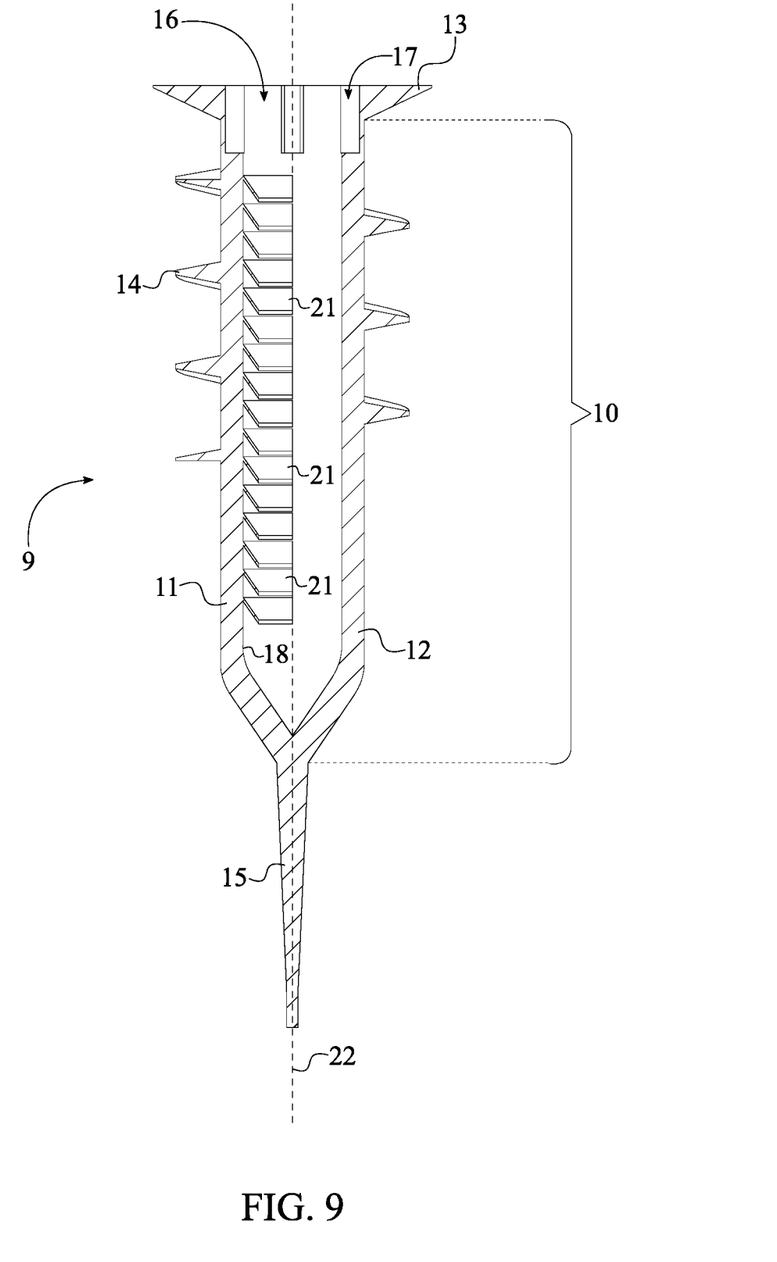
FIG. 9 is a cross section view of the female anchor taken along the line A-A of FIG. 8.
Figure 11:
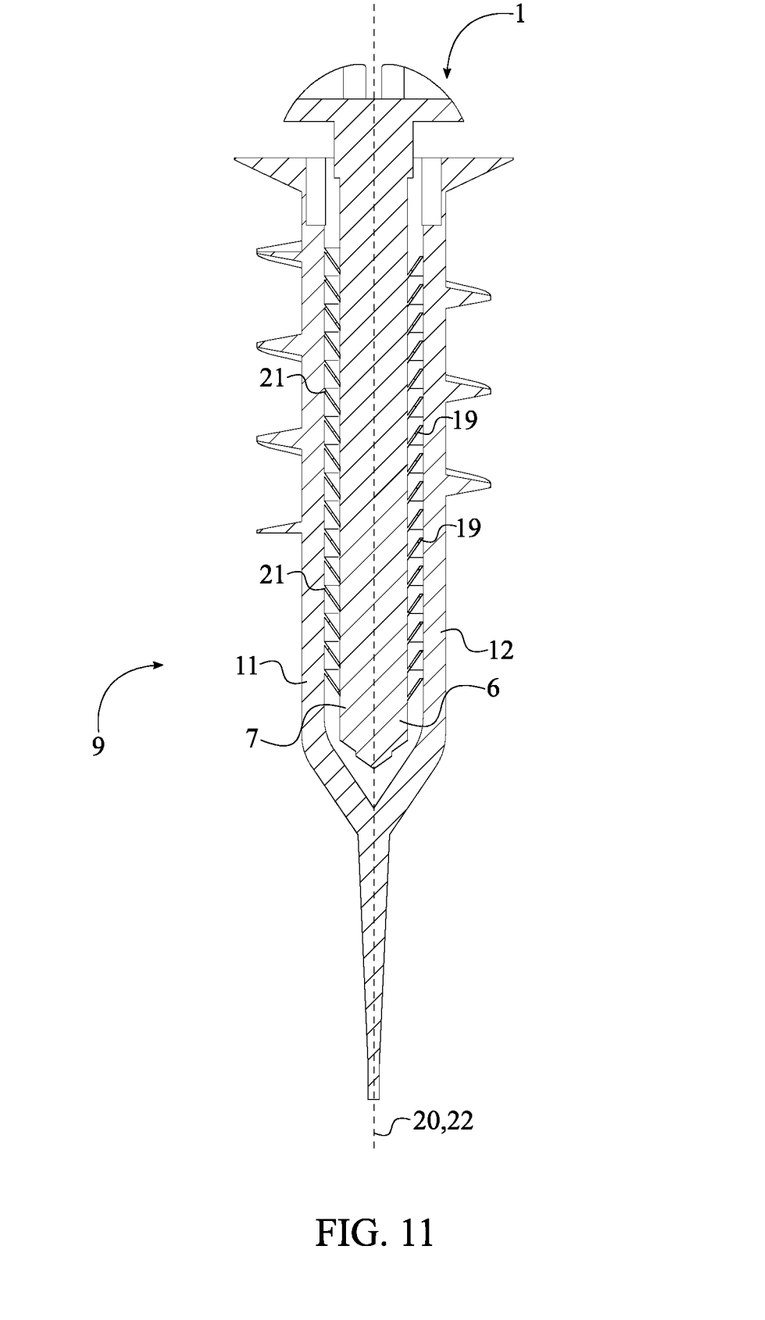
FIG. 11 is a cross section view of the male fastener and the female anchor, wherein the first plurality of half-circular fins is disengaged from the second plurality of half-circular fins.

In reference to FIG. 9-11, the present invention comprises a first central axis 20 and a second central axis 22. The first central axis 20 is concentrically positioned along the distal shaft section 5. The first central axis 20 is configured to define the center of the male fastener 1 to determine the relative position of the first plurality of half-circular fins 19. The second central axis 22 is concentrically positioned along a cylindrical body 10 of the female anchor 9. The second central axis 22 is configured to define the center of the female anchor 9 to determine the relative position of the second plurality of half-circular fins 21. The distal shaft section 5 comprises a first half 6 and a second half 7 and the cylindrical body 10 comprises a first half 11 and a second half 12. The first half 6 of the distal shaft section 5 and the first half 11 of the cylindrical body 10 are configured to hold the first plurality of half-circular fins 19 and the second plurality of half-circular fins 21, respectively. The first half 6 and the second half 7 of the distal shaft section 5 are radically connected to each other in order to form the complete distal shaft section 5. The first half 11 and the second half 12 of the cylindrical body 10 are radically connected to each other in order to form the complete cylindrical body 10.

In reference to FIGS. 6 and 10, the first plurality of half-circular fins 19 is distributed along the first central axis 20. This configuration ensures each of the first plurality of half-circular fins 19 is paralleled to each other on the first half 6 of the distal shaft section 5. The first plurality of half-circular fins 19 is terminally connected to the first half 6 of the distal shaft section 5. This configuration ensures each of the first plurality of half-circular fins 19 lined up correctly with the corresponding second plurality of half-circular fins 21. The second plurality of half-circular fins 21 is distributed along the second central axis 22. This configuration ensures each of the second plurality of half-circular fins 21 is parallel to each other on the first half 11 of the cylindrical body 10. The second plurality of half-circular fins 21 is terminally connected to the first half 11 of the cylindrical body 10. This configuration ensures each of the second plurality of half-circular fins 21 lined up correctly with the corresponding first plurality of half-circular fins 19.

In reference to FIGS. 6, 7, and 10, as the user introduces the male fastener 1 into the female anchor 9 via the main opening 16, the first half 6 of the distal shaft section 5 is adjacently positioned to the first half 11 of the cylindrical body 10. This configuration ensures each of the first plurality of half-circular fins 19 engaged with the corresponding second plurality of half-circular fins 21 when the male fastener 1 is fully introduced into the female anchor 9. The second half 7 of the distal shaft section 5 is adjacently positioned to the second half 12 of the cylindrical body 10. This configuration ensures each of the second plurality of half-circular fins 21 engaged with the corresponding first plurality of half-circular fins 19 when the male fastener 1 is fully introduced into the female anchor 9. Then the first plurality of half-circular fins 19 is tensionably engaged with the second plurality of half-circular fins 21. This ensures the male fastener 1 is fully locked into the proper position within the female anchor 9.

In reference to FIGS. 6, 7, and 11, as the user removes the male fastener 1 from the female anchor 9 via the main opening 16, the user needs to turn then pull the male fastener 1 out of the female anchor 9. The first half 6 of the distal shaft section 5 is adjacently positioned to the second half 12 of the cylindrical body 10. This position ensures each of the first plurality of half-circular fins 19 disengaged with the corresponding second plurality of half-circular fins 21 when the male fastener 1 is turned 180 degrees. The second half 7 of the distal shaft section 5 is adjacently positioned to the first half 11 of the cylindrical body 10. This position ensures each of the second plurality of half-circular fins 21 disengage with the corresponding first plurality of half-circular fins 19 when the male fastener 1 is turned 180 degrees. Then the first plurality of half-circular fins 19 is diametrically opposed to the second plurality of half-circular fins 21. This configuration ensures the male fastener 1 is fully unlocked from the female anchor 9, and the user may remove the male fastener 1 without damaging either the first plurality of half-circular fins 19 or the second plurality of half-circular fins 21

In reference to FIGS. 10 and 11, there are three possible configurations relating to the flexibility of the first and second plurality of half-circular fins 21. In the first configuration, the first plurality of half-circular fins 19 is flexible while the second plurality of half-circular fins 21 is rigid. This configuration creates less friction when the user introduces the male fastener 1 into the female anchor 9, since the flexible first plurality of half-circular fins 19 may bend and slip to the corresponding second plurality of half-circular fins 21 until the male fastener 1 is fully introduced into the female anchor 9. Each of the first plurality of half-circular fins 19 remain engaged with each of the corresponding second plurality of half-circular fins 21 to lock the male fastener 1 in place. In the second configuration, the second plurality of half-circular fins 21 is flexible while the first plurality of half-circular fins 19 is rigid. This configuration creates less friction when the user removes the male fastener 1 from the female anchor 9, since the flexible second plurality of half-circular fins 21 may bend and slip to the corresponding first plurality of half-circular fins 19 until the male fastener 1 is fully removed from the female anchor 9. Each of the first plurality of half-circular fins 19 remains disengaged with each of the corresponding second plurality of half-circular fins 21. In the third configuration, both the first and second plurality of half-circular fins are flexible. This configuration combines the benefits from the above two configurations and creates less friction during both the introduction and removal of male fastener 1 with the female anchor 9, both the first plurality of half-circular fins 19 and the second plurality of half-circular fins 21 may bend and allow both the first plurality of half-circular fins 19 and the second plurality of half-circular fins 21 to slip into each other until the male fastener 1 is fully introduced into the female anchor 9. Each of the first plurality of half-circular fins 19 remains engaged or disengaged with each of the corresponding second plurality of half-circular fins 21 to lock the male fastener 1 in place or remove the male fastener 1 from the female anchor 9.

In reference to FIGS. 6 and 10, the user may use the following method with the present invention: First, the user may attach the female anchor 9 onto drywall or other surfaces. Then the user makes sure the first plurality of half-circular fins 19 is engaged with the second plurality of half-circular fins 21 as the user introduce the male fastener 1 into the female anchor 9 until the tip section 8 of the male fastener 1 cannot go any further within the female anchor 9. The fully introduced male fastener 1 may expand the female anchor 9 and ensures the present invention is secured on the drywall.

In reference to FIGS. 6 and 11, when the user wishes to remove the present invention, the user needs to turn the male anchor 180 degrees so each of the first plurality of half-circular fins 19 is fully disengaged with each corresponding second plurality of half-circular fins 21. Then the user may pull the male fastener 1 away from the female anchor 9. The pulling process may shrink the female anchor 9 and unlock the female anchor 9 from the drywall.

Although the invention has been explained in relation to its preferred embodiment, it is to be understood that many other possible modifications and variations can be made without departing from the spirit and scope of the invention.

What is claimed is:

1. A screw and anchor assembly comprises:
   a male fastener;
   a female anchor;
   a first plurality of half-circular fins;
   a second plurality of half-circular fins;
   the male fastener comprises a distal shaft section;
   the female anchor comprises a main opening and an inner wall;
   the first plurality of half-circular fins being linearly distributed along the distal shaft section;
   the second plurality of half-circular fins being linearly distributed along the inner wall;
   the first plurality of half-circular fins and the second plurality of half-circle fins being linearly aligned with each other;
   the distal shaft section concentrically traversing into the main opening; and
   each of the first plurality of half-circle fins being selectively engaged with each of the second plurality of half-circular fins.

2. The screw and anchor assembly as claimed in claim 1 comprises:
   the male fastener comprises a head section, a shank section, and a distal shaft section;
   the head section, the shank section, and the distal shaft section being concentrically positioned to each other; and
   the head section being adjacently connected to the shank section;
   the distal shaft section being adjacently connected to the shank section, opposite to the head section.

3. The screw and anchor assembly as claimed in claim 2 comprises:
   the male fastener further comprises a tip section;
   the tip section being concentrically positioned with the distal shaft section; and
   the tip section being adjacently connected to the distal shaft section, opposite to the shank section.

4. The screw and anchor assembly as claimed in claim 2 comprises:
   the male fastener further comprises a drive; and
   the drive concentrically traversing into the head section, opposite to the shank section.

5. The screw and anchor assembly as claimed in claim 1 comprises:
   the female anchor comprises a cylindrical body, a flange, and at least one outer securing protrusion;
   the cylindrical body and the flange being concentrically positioned to each other;
   the flange being adjacently connected around the cylindrical body; and the at least one outer securing protrusion being externally connected onto the cylindrical body.

6. The screw and anchor assembly as claimed in claim 5 comprises:
the female anchor further comprises a tip; and
the tip being adjacently connected to the cylindrical body, opposite to the flange.

7. The screw and anchor assembly as claimed in claim 5 comprises:
the female anchor further comprises a drive; and
the drive concentrically traversing into the flange and the cylindrical body.

8. The screw and anchor assembly as claimed in claim 1 comprises:
a first central axis;
a second central axis;
the first central axis being concentrically positioned along the distal shaft section;
the second central axis being concentrically positioned along a cylindrical body of the female anchor;
the distal shaft section and the cylindrical body each comprises a first half and a second half;
the first half and the second half being radially connected to each other;
the first plurality of half-circular fins being distributed along the first central axis;
the first plurality of half-circular fins being terminally connected to the first half of the distal shaft section;
the second plurality of half-circular fins being distributed along the second central axis; and
the second plurality of half-circular fins being terminally connected to the first half of the cylindrical body.

9. The screw and anchor assembly as claimed in claim 8 comprises:
the first half of the distal shaft section being adjacently positioned to the first half of the cylindrical body;
the second half of the distal shaft section being adjacently positioned to the second half of the cylindrical body; and
the first plurality of half-circular fins and the second plurality of half-circular fins being tensionably engaged with each other.

10. The screw and anchor assembly as claimed in claim 8 comprises:
the first half of the distal shaft section being adjacently positioned to the second half of the cylindrical body;
the second half of the distal shaft section being adjacently positioned to the first half of the cylindrical body; and
the first plurality of half-circular fins being diametrically opposed to the second plurality of half-circular fins.

11. The screw and anchor assembly as claimed in claim 1, wherein the first plurality of half-circular fins being flexible, and wherein the second plurality of half-circular fins being rigid.

12. The screw and anchor assembly as claimed in claim 1, wherein the first plurality of half-circular fins being rigid, and wherein the second plurality of half-circular fins being flexible.

13. The screw and anchor assembly as claimed in claim 1, wherein the first plurality of half-circular fins being flexible, and wherein the second plurality of half-circular fins being flexible.

* * * * *